United States Patent
Terada

(10) Patent No.: US 6,297,619 B1
(45) Date of Patent: *Oct. 2, 2001

(54) SECONDARY BATTERY CELL PROTECTION CIRCUIT

(75) Inventor: Yukihiro Terada, Isehara (JP)

(73) Assignee: Mitsumi Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/393,895

(22) Filed: Sep. 10, 1999

(30) Foreign Application Priority Data

Oct. 1, 1998 (JP) .................................. 10-280345

(51) Int. Cl.[7] .................................. H02J 7/00
(52) U.S. Cl. .................................. 320/134; 307/10.7
(58) Field of Search .................................. 320/134, 136; 361/90, 92, 115; 307/10.1, 10.7

(56) References Cited

U.S. PATENT DOCUMENTS

| | | | |
|---|---|---|---|
| 5,789,900 | * | 8/1998 | Hasegawa .................. 320/136 |
| 6,064,179 | * | 2/1999 | Ito et al. .................. 320/128 |
| 6,075,346 | * | 10/1998 | Kikuchi et al. ............. 320/134 |

FOREIGN PATENT DOCUMENTS 09056056   2/1997   (JP) .

* cited by examiner

*Primary Examiner*—Peter S. Wong
*Assistant Examiner*—Pia Tibbits
(74) *Attorney, Agent, or Firm*—Ladas & Parry

(57) ABSTRACT

A secondary battery cell protection circuit protects a charge control FET, a discharge control FET, and a secondary battery cell from destruction due to use of a charger of greater than rated voltage to charge the secondary battery cell. The secondary battery cell protection circuit has a charger voltage detection circuit, a first charge circuit control circuit for cutting off a charge circuit when the charger voltage detection circuit detects a charger voltage in excess of a predetermined value, and a second charge control circuit for cutting off a charge circuit when the over-charge detection circuit detects a secondary battery cell charge voltage in excess of a predetermined value. When the charge control FET is OFF, a load voltage proportionate to the charge voltage of the charger appears at a −B terminal and is applied to the emitter of a transistor, activating the transistor. A current proportionate to the charge voltage of the charger then flows to the transistor. If at this time the charger voltage is above the rated voltage, then a resistor is set so that a voltage drop of the resistor exceeds a base voltage. As a result, when the charger voltage is above the rated voltage the charge voltage of the secondary battery cell declines thereafter and a charge control FET drive transistor remains in an OFF state even after the charge voltage is at or below a release charge voltage.

7 Claims, 5 Drawing Sheets though the over-charge detection circuit 14 determines whether or not an over-charge exists based on the VCC terminal voltage, in fact such a determination does not necessarily match the relation between the voltage of the secondary battery cell 1 and the

SECONDARY BATTERY CELL PROTECTION CIRCUIT

BACKGROUND OF THE INVENTION

1. Field of the Invention

The present invention relates generally to a secondary battery cell protection circuit, and more particularly, to a lithium-ion battery cell protection circuit capable of shutting down a charge circuit when a charge voltage in excess of a predetermined voltage is applied.

2. Description of the Related Art

Compared to the conventional nickel-cadmium battery cell or nickel-hydrogen battery, the light, compact lithium-ion battery that is one type of secondary battery cell delivers approximately three times as much operating voltage, approximately twice as much power per unit of weight and substantially greater power per unit of volume as well. The power, lightness and compactness of the lithium-ion battery cell has led to its widespread use in video cameras, portable telephones, PHS, notebook-type personal computers and a wide array of other portable electronic products.

In order to ensure the safety and enhance the performance of these light, compact but powerful battery cells, protection circuits are used.

FIG. 1 shows the circuit conventionally used to protect secondary battery cells such as the lithium-ion battery cell. This circuit has a battery cell protection circuit 20, resistors R1–R3, capacitors C1–C3, discharge control field-effect transistor (hereinafter FET) Q1 and charge control FET Q2. Either a charger or a load is connected between terminal +B and terminal −B.

The battery cell protection circuit 20 has an over-current detection circuit 10, an over-discharge detection circuit 11, a discharge control unit dead time circuit 12, a charge/load detection circuit 13, an over-charge detection circuit 14, a dead time setting circuit and a charge control FET drive transistor TR1.

The VCC terminal of the battery cell protection circuit 20 is connected to the positive terminal of the secondary battery cell 1 via resistor R1 and capacitor C1.

The GND terminal is the terminal connected to the negative terminal of the secondary battery cell 1 and is also the battery cell protection circuit 20 ground terminal (standard power terminal).

The DO terminal is the discharge control FET Q1 drive output terminal. When there is an over-discharge the output appearing at the DO terminal turns the discharge control FET Q1 OFF, the charge/discharge path 30 is cut and the discharge stopped.

The VM terminal is an over-current detection terminal, and is connected to the −B terminal via resistor R3.

The TD terminal is the charge control dead time setting terminal. This TD terminal is grounded via capacitor C2. This capacitor C2 is connected to the dead time setting circuit 15 and determines the dead time of the over-charge detection circuit 14.

The CO terminal is the drive output terminal for the charge control FET Q2. When the over-charge detection circuit 14 detects an overcharge, transistor TR1 is shut OFF, a LOW-level signal is applied to the CO terminal, that LOW-level signal is applied to the gate of the charge control FET Q2 and the charge control FET Q2 turns OFF. When the charge control FET Q2 turns OFF, one charge-discharge path consisting of the negative terminal of the secondary battery and the −B terminal discharge path 30 is cut and charging stops.

The over-discharge detection circuit 11 detects the voltage at the VCC terminal and, if the voltage detected at the VCC terminal meets or exceeds an over-discharge detection voltage $V_s$ of, for example, 2.3 V, maintains a state of operation. If the VCC terminal voltage is less than an over-discharge voltage $V_s$ the over-discharge detection circuit 11 outputs an over-discharge detection signal to the DO terminal, turns the discharge control FET Q1 OFF and stops the discharge.

In order to prevent repeated starting and stopping of the discharge, the over-discharge detection circuit 11 is set so that a shift to a normal mode, that is, a state in which there is no over-discharge, is carried out at a voltage exceeding the over-discharge voltage $V_s$. That is, the over-discharge detection circuit 11 has a hysteresis characteristic, in that the stopping of the discharge is carried out at the over-discharge voltage $V_s$ and the shift to a normal mode is carried out at a voltage larger than the over-discharge voltage $V_s$.

In addition, although the over-discharge detection circuit 11 determines whether or not an over-discharge exists based on the VCC terminal voltage, in fact such a determination does not necessarily match the relation between the voltage of the secondary battery cell 1 and the residual capacity of the secondary battery cell 1. In order therefore to derive maximum usage from the secondary battery cell 1 a discharge control unit dead time circuit 12 is provided so as to continue discharging for that time set by the discharge control unit dead time circuit 12 beginning with that point in time at which over-discharge detection was carried out, after which the discharge control FET Q1 is shut OFF.

Over-current detection circuit 10 is provided mainly as short-circuit protection for the power charge/discharge path 30.

A charger or a load is connected to the +B and −B terminals. The charger/load detection circuit 13 detects whether a charger or a load is connected to the +B and −B terminals.

The over-charge detection circuit 14 detects the voltage at the VCC terminal and, if the voltage detected at the VCC terminal is less than or equal to an over-charge detection voltage $V_{ALM}$ off, for example, 4.2 V, maintains a state of operation. If the VCC terminal voltage exceeds an over-charge voltage $V_{ALM}$ the over-charge detection circuit 14 outputs an over-charge detection signal to the base of transistor TR1. As a result, the charge control FET Q2 turns OFF, stopping the charging of the secondary battery cell 1.

In order to prevent repeated starting and stopping of the charge, the over-charge detection circuit 14 is set so that a release to a normal mode, that is, a state in which there is no over-charge, is carried out at a release voltage ($V_P$: $V_{ALM}-\Delta V$) less than the overcharge detection voltage $V_{ALM}$. That is, the over-charge detection circuit 14 has a hysteresis characteristic, in that the stopping of the charging is carried out at the over-charge detection voltage $V_{ALM}$ and the release to a normal mode is carried out at a release voltage ($V_P$: $V_{ALM}-\Delta V$) less than the overcharge detection voltage $V_{ALM}$.

However, it is known that although the over-charge detection circuit 14 determines whether or not an over-charge exists based on the VCC terminal voltage, in fact such a determination does not necessarily match the relation between the voltage of the secondary battery cell 1 and the amount by which the secondary battery cell 1 has been charged. In order therefore to charge the secondary battery cell 1 fully before cutting the charge circuit a dead time setting circuit 15 is provided so as to continue charging for that time set by the dead time setting circuit 15, beginning with the point in time at which over-charge detection was carried out. The dead time of the dead time setting circuit 15 can be set to a desired time by changing the capacitor C2 connected to the TD terminal.

FIG. 2 is a diagram showing a time chart of the operation of the conventional secondary battery cell protection circuit shown in FIG. 3. The chart depicts an example in which charging of the secondary battery cell begins at a time t1 and terminates thereafter at a time t10 at which an over-discharge is detected and the discharge circuit cut off. T1–t5 represent a charge mode, during which an overcharge ($V_{ALM}$) is detected at t3 and the charge control FET is turned OFF at t4. The interval t3–t4 is over-charge dead time. T5–t8 represent a discharge mode, with a load connected at t5 and an over-current detected at t6. After a dead time at t6–t7 the discharge control FET is turned OFF. Further, t8–t9 represent a charge mode during which interval charging is carried out. At t9 a load is connected and a discharge mode is entered.

However, charging is possible in the following situation, described in reference to FIG. 4:

(1) Initial charge period: t1–t4

When the charge voltage of the secondary battery cell is less than the over-charge detection voltage ($V_{ALM}$) (t1–t3) and during over-charge dead time (t3–t4)

(2) After over-charge detection: tp and later

After over-charge detection, when the charge voltage of the secondary battery cell is less than a release voltage ($V_P$: $V_{ALM}-\Delta V$) (tp and later)

At t3 an overcharge ($V_{ALM}$) is detected, the charge control FET turns OFF at a dead time t4 and charging stops. Thereafter the secondary battery cell charge voltage declines due to discharge. When this charge voltage becomes a release voltage ($V_P$: $V_{ALM}-\Delta V$) at point P it is possible to charge during the time after tp.

(3) After over-discharge detection: t8 and later

After over-discharge detection, charging is possible during the interval given in (1) above.

However, charging during situations (1) through (3) as described above is conducted without regard to the voltage of the charger. Therefore if the charger voltage exceeds the rated voltage the discharge control FET and charge control FET connected to the charge circuit could be destroyed, as could the secondary battery cell to be charged.

SUMMARY OF THE INVENTION

Accordingly, it is a general object of the present invention to provide an improved and useful secondary battery cell protection circuit in which the problem described above is eliminated. A more specific object of the present invention to provide a secondary battery cell protection circuit in which destruction of the charge control FET and discharge control FET as well as the secondary battery cell to be charged by a charger of non-rated voltage is prevented.

Another object of the present invention is to provide a secondary battery cell protection circuit of simplified circuit structure and reduced power consumption.

The above-described objects of the present invention are achieved by a secondary battery cell protection circuit for protecting a secondary battery cell according to the voltage of the secondary battery cell, comprising:

a charger voltage detection circuit detecting a charger voltage; and a first charge circuit control circuit cutting off a charge circuit when the charger voltage detection circuit detects a charger voltage in excess of a predetermined value.

Additionally, the above-described objects of the present invention are also achieved by the secondary battery cell protection circuit as described above, wherein the first charge circuit control circuit controls a charge control field-effect transistor (FET) inserted in series into the charge circuit and shuts off the charge control FET when the charger voltage detection circuit detects a charger voltage in excess of a predetermined value.

Additionally, the above-described objects of the present invention are also achieved by the secondary battery cell protection circuit as described above, further comprising an over-charge detection circuit and a second charge circuit control circuit, the second charge circuit control circuit cutting off the charge circuit when the over-charge detection circuit detects a secondary battery cell charge voltage in excess of a predetermined value.

According to the invention described above, destruction of the charge control FET, the discharge control FET and the secondary battery cell itself by use of a charger exceeding the rated voltage can be prevented.

Additionally, the above-described objects of the present invention are also achieved by the secondary battery cell protection circuit as described above, wherein the first charge circuit control circuit and the second charge circuit control circuit, respectively, include a switching element which cuts off the charge circuit, the switching element being used for both the first and second charge circuit control circuits.

According to the invention described above, by consolidating the switching element for the first and second charge circuit control circuits it is possible to simplify the circuit structure of the secondary battery cell protection circuit.

Additionally, the above-described objects of the present invention are also achieved by the secondary battery cell protection circuit as described above, wherein the charger voltage detection circuit functions when the charge circuit is cut off.

According to the invention described above, the charger voltage detection circuit does not function during a normal charge/discharge mode, thereby reducing consumption of power.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

A description will now be given of an embodiment of the present invention with reference to the accompanying drawings.

Figure 1:
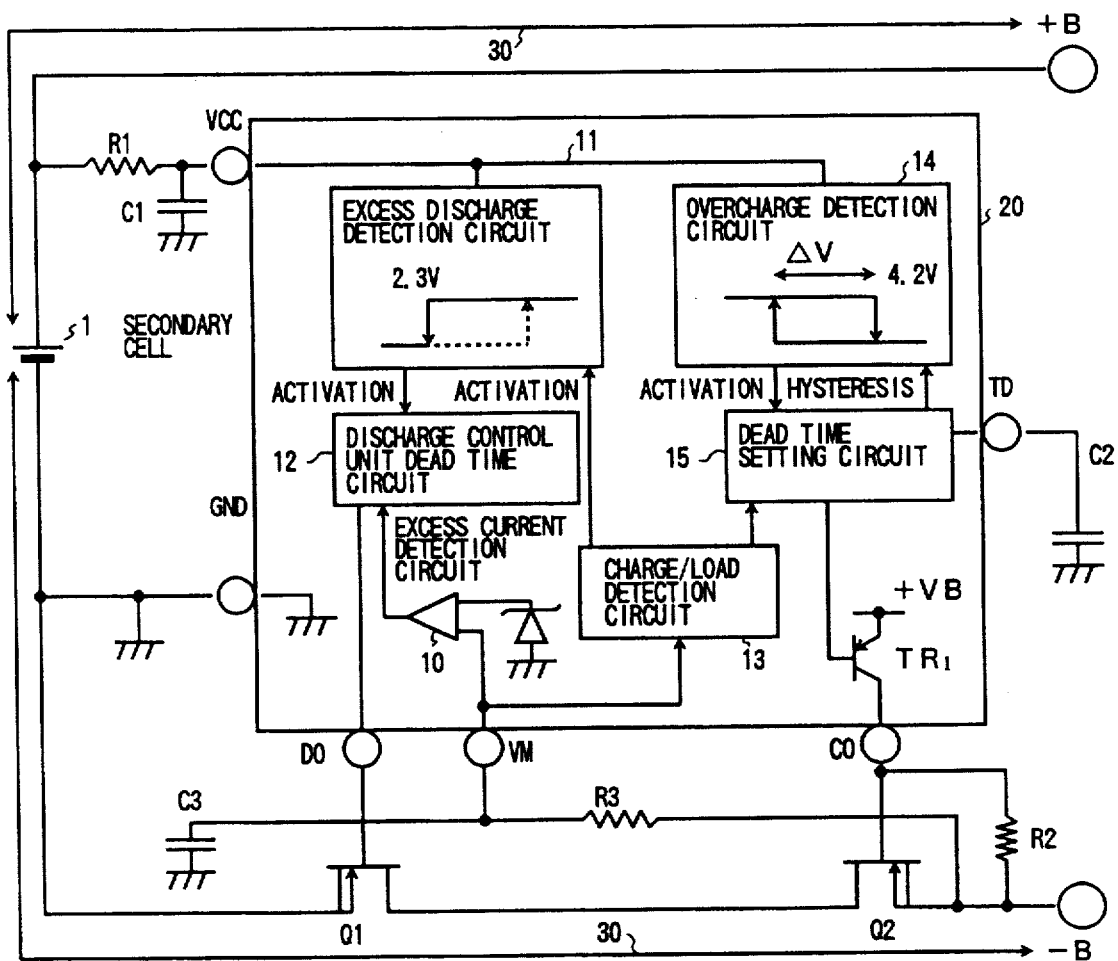
FIG. 1 is a diagram of the circuit conventionally used to protect secondary battery cells.
Figure 3:
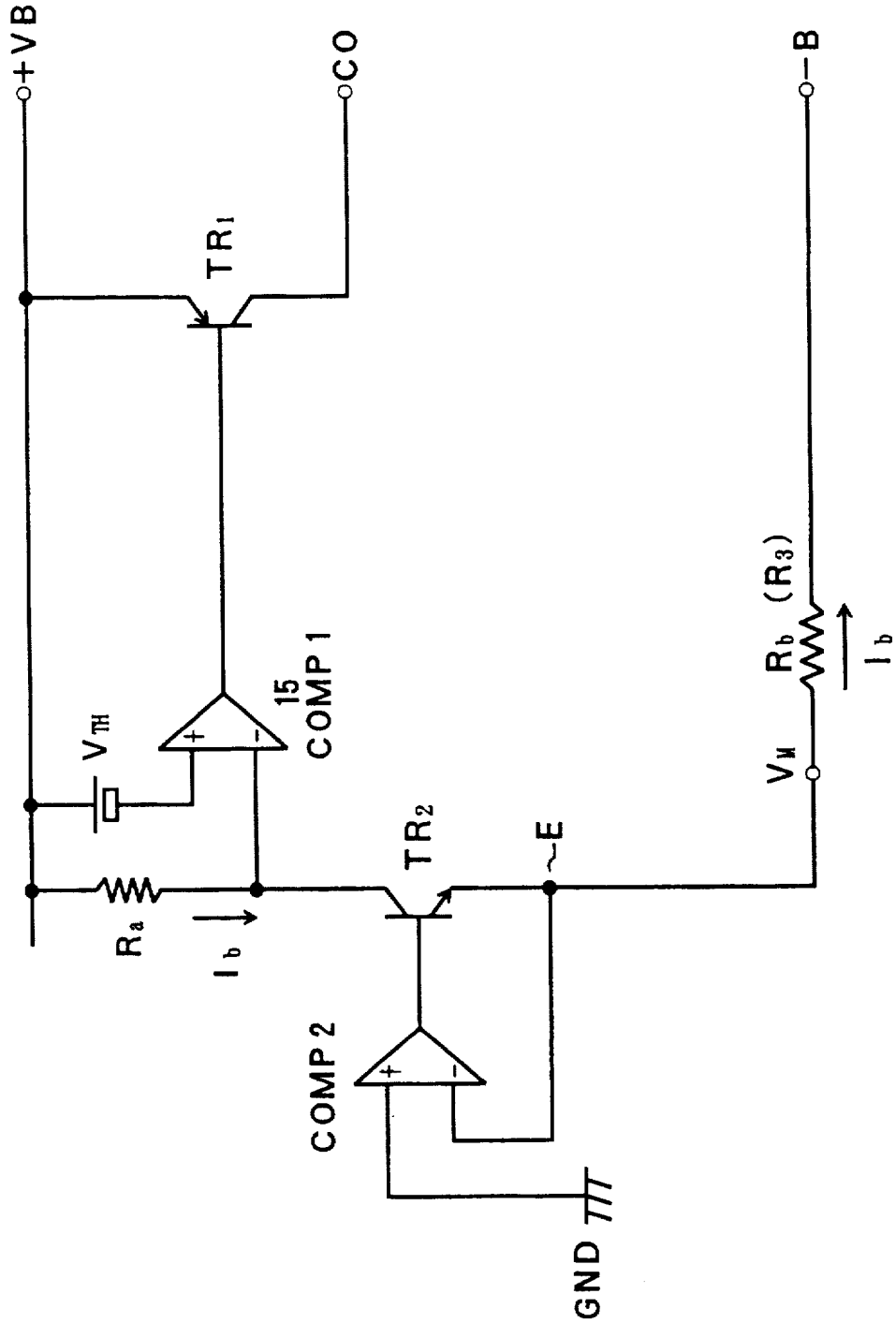
FIG. 3 is a diagram illustrating an embodiment of the present invention.

FIG. 3 is a diagram illustrating an embodiment of the present invention, comprising transistors TR1, TR2, comparators COMP1, COMP2 and resistors Ra, Rb. It should be noted that transistor TR1 shown in FIG. 3 corresponds to the charge control FET drive transistor TR1 shown in FIG. 1, the VM terminal and the CO terminal shown in FIG. 3 correspond to the VM terminal and CO terminal shown in FIG. 1 and the resistor Rb shown in FIG. 1 corresponds to the resistor R3 shown in FIG. 3.

Figure 2:
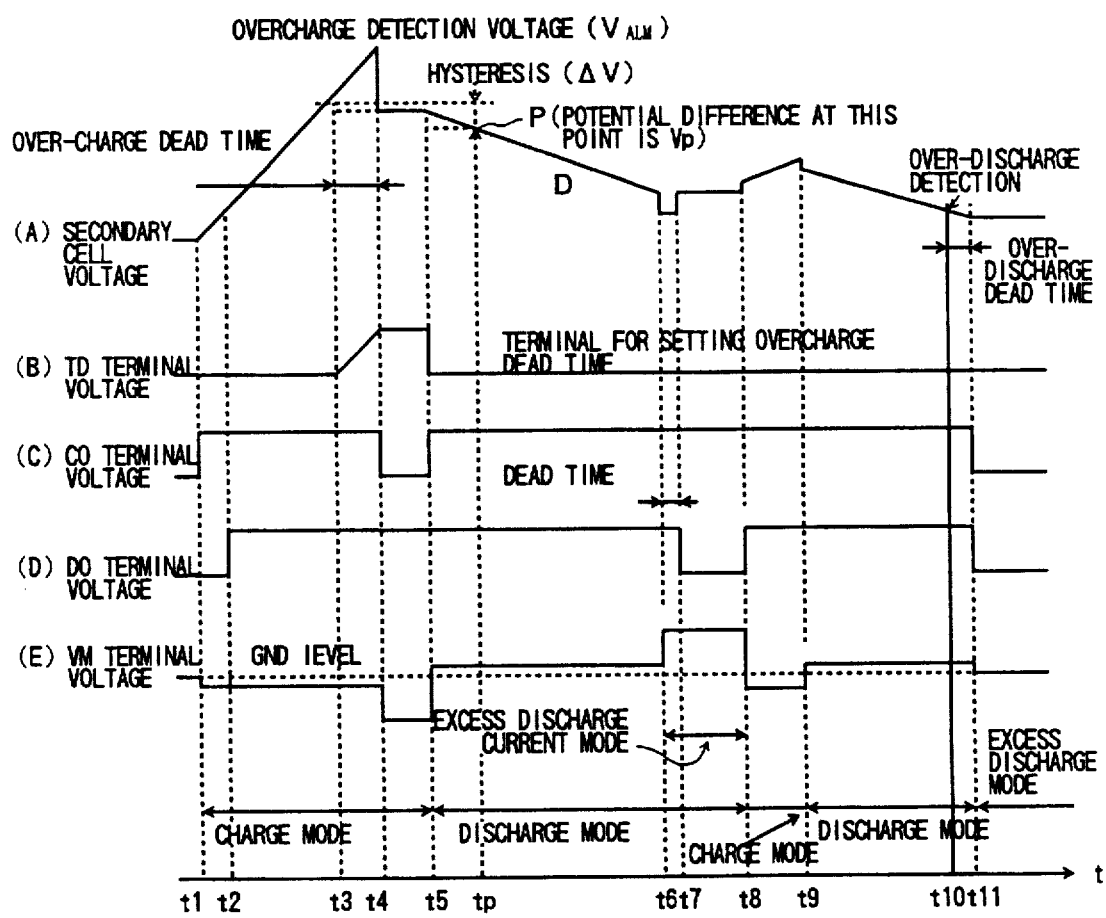
FIG. 2 is a diagram showing a time chart of the operation of the conventional secondary battery cell protection circuit shown in FIG. 1.

It will be appreciated that even if a charger is connected between the +B terminal and the −B terminal during charge and discharge mode, the −B terminal is essentially at ground level at this time because charge control FET Q2 and discharge control FET Q1 are activated. For the sake of accuracy it should be noted, however, that, as shown in FIG. 2, the voltage drop at charge control FET Q2 and discharge control FET Q1 causes a slight negative charge to be maintained as determined by the charge current when charging and causes a slight positive charge to be maintained as determined by the discharge current when discharging. At the same time, when a charger is connected between the +B terminal and −B terminal and the charge control FET is OFF, a negative charge appears at the −B terminal.

The switching transistor TR2 is cut off when the output from comparator COMP2 indicates that the charge at the emitter E of transistor TR2 is higher than ground level. On the other hand, switching transistor TR2 is activated when the output from comparator COMP2 indicates that the charge at the emitter E of transistor TR2 is lower than ground level.

Figure 4:
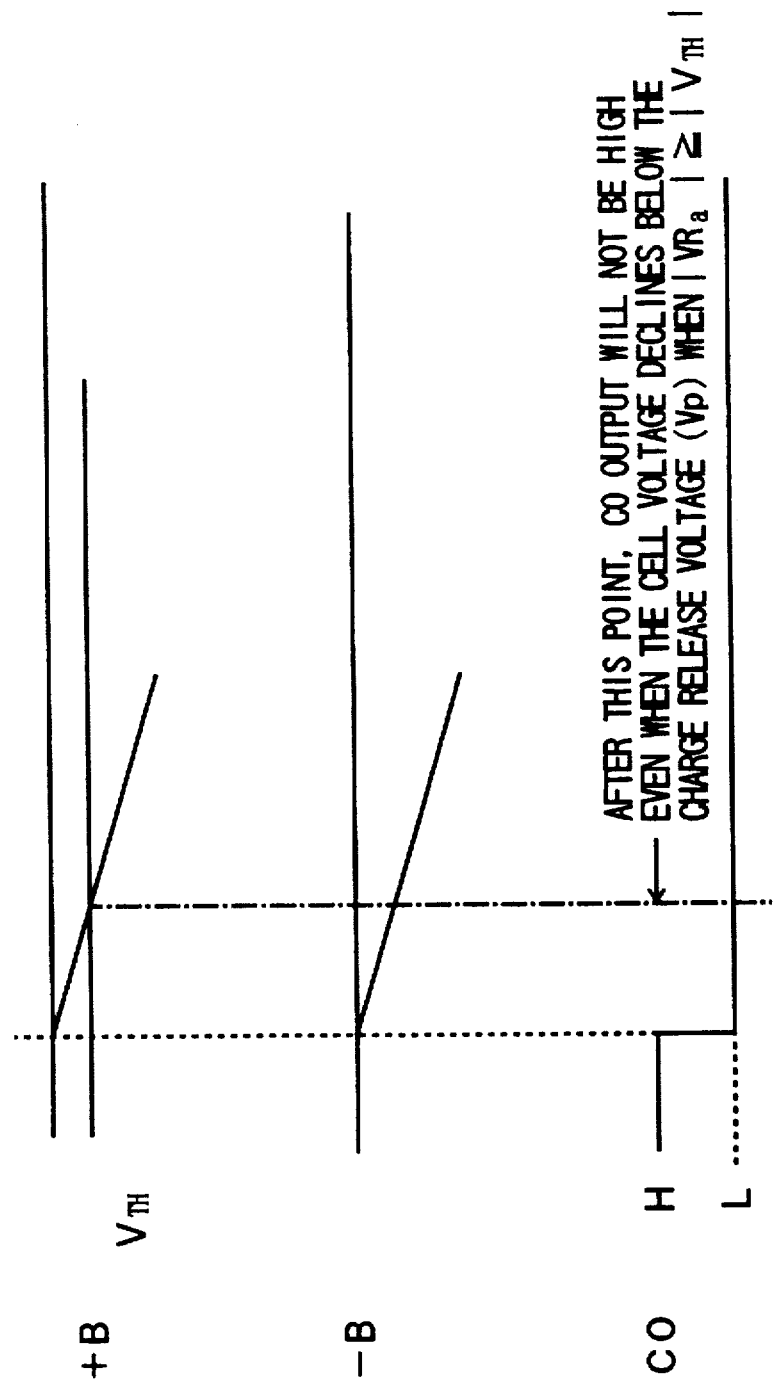
FIG. 4 is a diagram illustrating the operation of the embodiment shown in FIG. 1.

For example, consider a state in which, as shown in FIG. 4, the over-charge detection circuit 14 detects an overcharge, the charge control FET drive transistor TR1 turns OFF and the CO terminal outputs a LOW level signal. When the CO terminal output is LOW the charge control FET Q2 is turned OFF and a negative charge proportional to the charge voltage of the charger appears at the −B terminal. The negative charge at the −B terminal is applied to the emitter E of transistor TR2. In this case, a ground level is applied to the base of transistor TR2, so transistor TR2 is activated. At this time a current Ib (=V(−B)/Rb: where V (−B) is the voltage at the −B terminal) flows to transistor TR2. This current Ib also flows to resistor Ra. If the voltage drop across resistor Ra is larger than a base voltage $V_{TH}$ of comparator COMP1, then the voltage drop is applied to the base of charge control FET drive transistor TR1, turning charge control FET drive transistor TR1 OFF.

The value of this current Ib is proportionate to the charge on the −B terminal, that is, the charge voltage of the charger. It should be noted that resistor Ra is set so that the voltage drop across resistor Ra does not exceed the base voltage $VT_H$ of the comparator COMP1 when the charger voltage is below the rated voltage and the voltage drop across resistor Ra does exceed the base voltage $V_{TH}$ of the comparator COMP1 when the charger voltage is above the rated voltage.

Accordingly, if the charger voltage is below the rated voltage the secondary battery cell charging charge declines below a release voltage VP, the charge control FET drive transistor TR1 is activated by a control signal from the over-charge detection circuit and charging is enabled. However, if the charger voltage is above the rated voltage, even if the secondary battery cell charging charge declines below a release voltage VP and a control signal from the over-charge detection circuit attempts to activate the charge control FET drive transistor TR1, a signal from a comparator COMP1 maintains the transistor TR1 in an OFF state.

Figure 5:
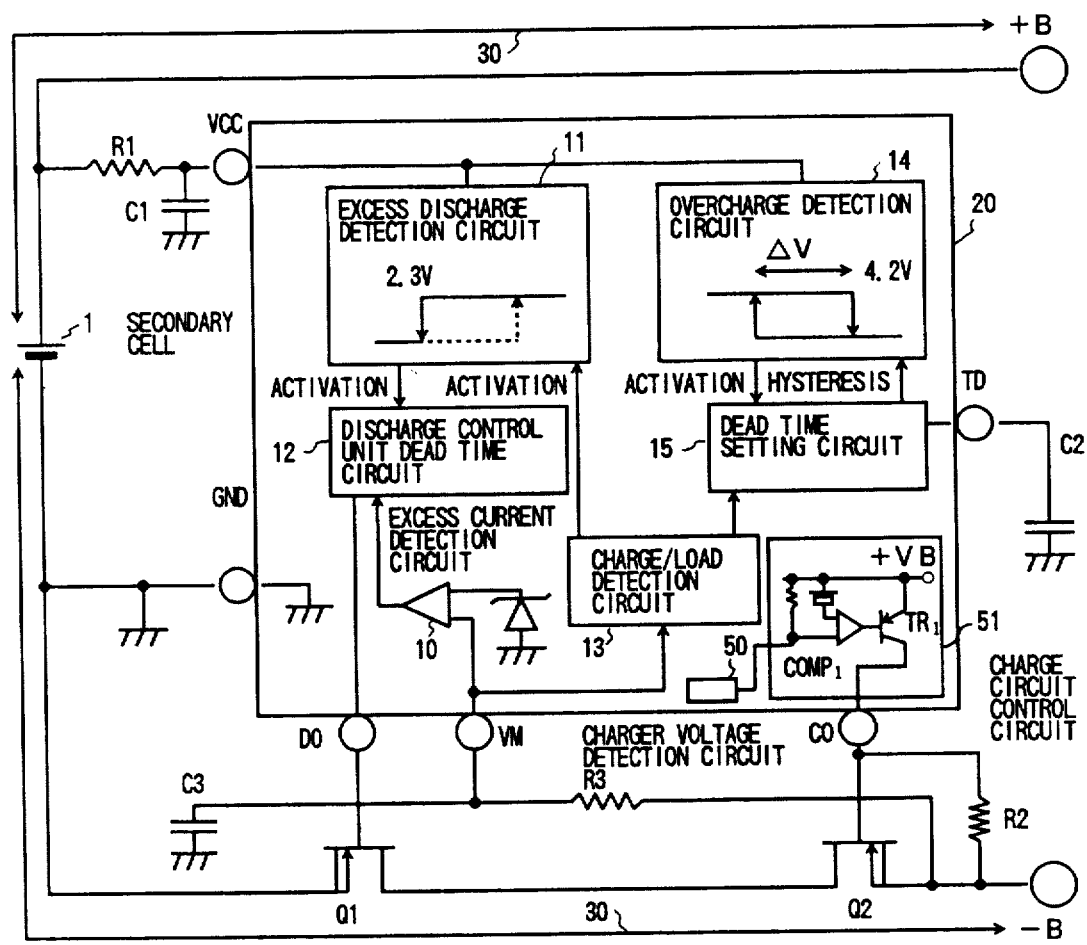
FIG. 5 is a diagram showing the structure of an embodiment of the secondary battery cell protection circuit according to the present invention.

FIG. 5 is a diagram of the structure of the embodiment of the secondary battery cell protection circuit according to the present invention. FIG. 5 represents a combination of FIG. 1 and FIG. 3, with the addition of the charger voltage detection circuit 50 and the charge circuit control circuit 51.

As described above, a charger exceeding the rated voltage connected between the +B and −B terminals is prevented from charging, and thus destruction of the charge control FET, the discharge control FET and the secondary battery cell itself is prevented.

Additionally, although the description provided above assumes the use of an N-channel MOSFET for the discharge control FET and the charge control FET, other types of FET may be used, for example a P-channel MOSFET, a P-channel JFET and an N-channel JFET.

Further, in the embodiment described above the discharge control FET and the charge control FET are inserted in the power line on the negative side of the −B terminal and secondary battery cell. However, the discharge control FET and the charge control FET may be inserted in the charge/discharge path on the positive side of the +B terminal and secondary battery cell.

Additionally, although the embodiment described above references a lithium–ion battery cell, the present invention is not limited to such battery cells but is effective with other types of secondary battery cells as well, such as a nickel-cadmium battery cell or a nickel-hydrogen battery.

The above description is provided in order to enable any person skilled in the art to make and use the invention and sets forth the best mode contemplated by the inventor of carrying out the invention.

The present invention is not limited to the specifically disclosed embodiment, and variations and modifications may be made without departing from the scope of the present invention.

The present application is based on Japanese priority application no. 10-280345 filed on Oct. 1, 1998, the entire contents of which are hereby incorporated by reference.

What is claimed is:

1. A secondary battery cell protection circuit for protecting a secondary battery cell according to the voltage of the secondary battery cell, comprising:

a charger voltage detection circuit detecting a charger voltage;

a first charge circuit control circuit cutting off a charge circuit when the charger voltage detection circuit detects a charger voltage in excess of a predetermined value; and an over-discharge detection circuit and an over-charge detection circuit and a charge control field-effect transistor wherein the charge control field-effect transistor is turned off when the over-charge detection circuit detects an overcharge of the secondary battery cell.

2. The secondary battery protection circuit as claimed in claim 1, wherein the first the first charge circuit control circuit controls the charge control field-effect transistor (FET) Q2 inserted in series into the charge circuit and shuts off the charge control FET when the charger voltage detection circuit detects a chargers voltage in excess of the predetermined value.

3. The secondary battery protection circuit as claimed in claim 2, further comprising the over-charge detection circuit and a second charge circuit control circuit, the second charge circuit control circuit cutting off the charge circuit when the over-charge detection circuit detects a secondary battery cell charge voltage in excess of a predetermined value.

4. The secondary battery cell protection circuit as claimed in claim 3, wherein the first charge circuit control circuit and the second charge circuit control circuit, respectively, include a switching element which cuts off the charge circuit, the switching element being used for both the first and second charge circuit control circuits.

5. The secondary battery protection circuit as claimed in claim 1, further comprising the over-charge detection circuit and a second charge circuit control circuit, the second charge circuit control circuit cutting off the charge circuit when the over-charge detection circuit detects a secondary battery cell charge voltage in excess of a predetermined value.

6. The secondary battery cell protection circuit as claimed in claim 5, wherein the first charge circuit control circuit and the second charge circuit control circuit, respectively, include a switching element which cuts off the charge circuit, the switching element being used for both the first and second charge circuit control circuits.

7. The secondary battery cell protection circuit as claimed in claim 1, wherein the charger voltage detection circuit functions when the charge circuit is cut off.

* * * * *

UNITED STATES PATENT AND TRADEMARK OFFICE
CERTIFICATE OF CORRECTION

PATENT NO. : 6,297,619 B1  Page 1 of 1
DATED : October 2, 2001
INVENTOR(S) : Yukihiro Terada It is certified that error appears in the above-identified patent and that said Letters Patent is hereby corrected as shown below:

Column 1,
Line 37, after "setting circuit" insert -- 15 --;

Column 2,
Line 42, change "off" to -- of --;

Column 5,
Line 52, change "$VT_H$" to -- $V_{TH}$ --;

Column 6,
Line 55, delete "the first" second occurrence;
Line 59, change "chargers" to -- charger --;

Signed and Sealed this

Twenty-second Day of April, 2003

JAMES E. ROGAN
*Director of the United States Patent and Trademark Office*